Aug. 26, 1952 W. PAULE ET AL 2,608,627
CONTROL MEANS FOR DIRECTIONAL SIGNAL
SYSTEMS FOR MOTOR VEHICLES
Filed Dec. 26, 1950 2 SHEETS—SHEET 1
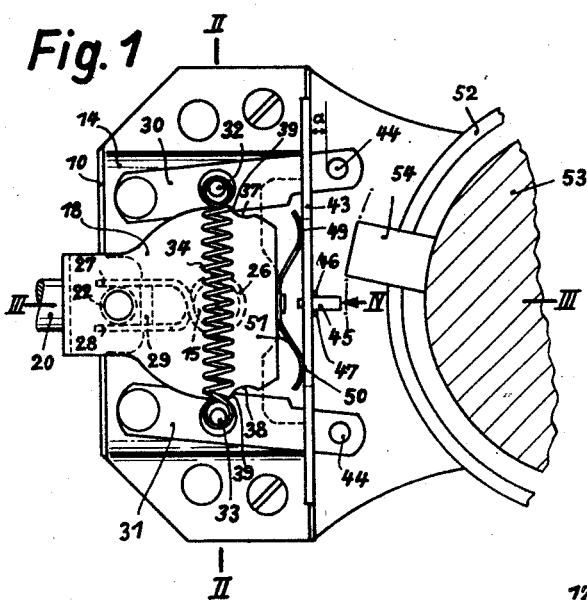
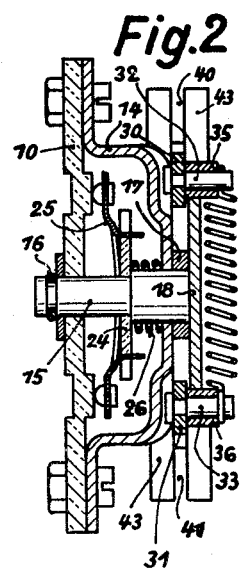
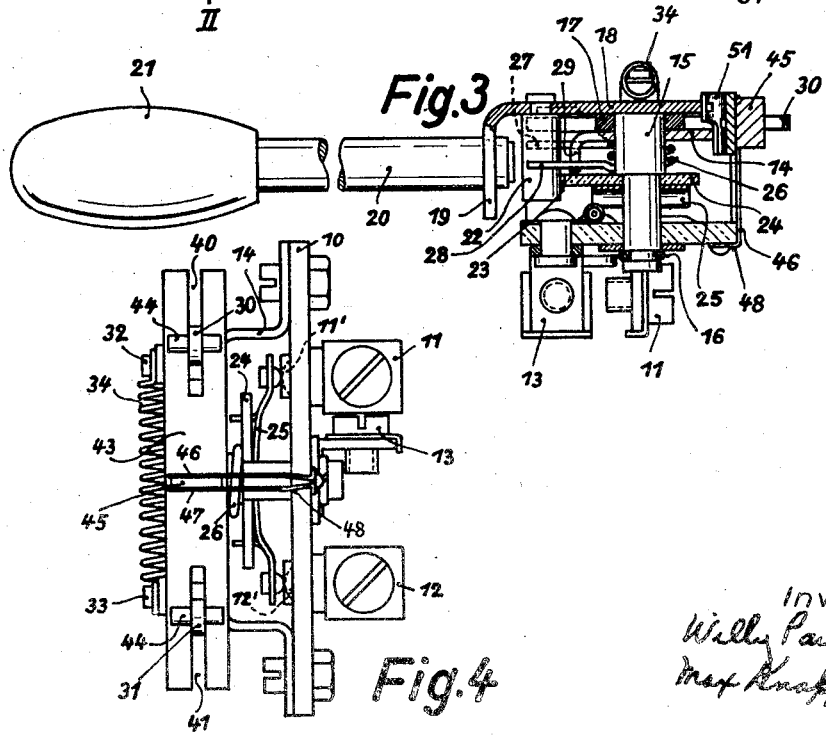
Inventors
Willy Paule
Max Knapfle
by
Stevens Davis Miller & Mosher
their Attorneys Patented Aug. 26, 1952

2,608,627

UNITED STATES PATENT OFFICE 2,608,627

CONTROL MEANS FOR DIRECTIONAL SIGNAL SYSTEMS FOR MOTOR VEHICLES

Willy Paule, Stuttgart, and Max Knapp, Hofingen, Germany, assignors to Robert Bosch G. m. b. H., Stuttgart, Germany Application December 26, 1950, Serial No. 202,624
In Germany January 12, 1950

7 Claims. (Cl. 200—59)

The invention relates to switches for a directional signal system automatically returned to its "off" position by the steering mechanism and relates particularly to switches of a type having a manually operated switch arm actuating a recessed cam plate which is locked in either one of its two turn indicating positions by one of two spring tensioned latch means hereinafter referred to as pawls, said pawls unlocking the cam plate when the steering mechanism is returned to its straight ahead position, the cam plate and the switch arm then being returned to the "off" position by spring means.

In previously known switches of this type the cam plate is held in either one of its turn indicating or "on" positions by one of two spring tensioned pawls linked together in form of scissors, the release of said pawl being effected by a steering shaft cam directly engaging an actuating member slidably mounted on the free end of the pawl.

The object of this invention is to eliminate certain inherent disadvantages of this previously known switch, which for instance requires that the steering shaft be turned over a relatively large angle in order to unlock the pawls, inasmuch as the steering shaft cam is directly engaging the pawls which necessarily have to be arranged a certain minimum distance away from one another. Furthermore the driver is unable to turn this switch from one "on" position to the other "on" position without previously having unlocked the pawl by turning the steering shaft. In addition, this switch cannot be locked in its "on" position when the respective pawl is in contact with the steering shaft cam as the pawl is thereby prevented from dropping into the recess provided on the cam plate.

These disadvantages are avoided in the new switch by effecting the unlocking of the pawls by means of an actuating member arranged in such a way as to be able to be moved in a direction substantially crosswise to the two pawls. The actuating member is operated by a cam or lug fastened to the steering shaft. Preferably this lug will engage the middle part of the actuating member.

Two embodiments of the invention are shown in the accompanying drawings of which:

Fig. 1 is a top view of an electrical switch for a direction indicating system,

Fig. 2 is a sectional view of the switch taken on line II—II of Fig. 1,

Fig. 3 is a sectional view of the switch taken on line III—III of Fig. 1,

Fig. 4 is a side view of the switch viewed in the direction of the arrow IV shown in Fig. 1.

Figure 5:
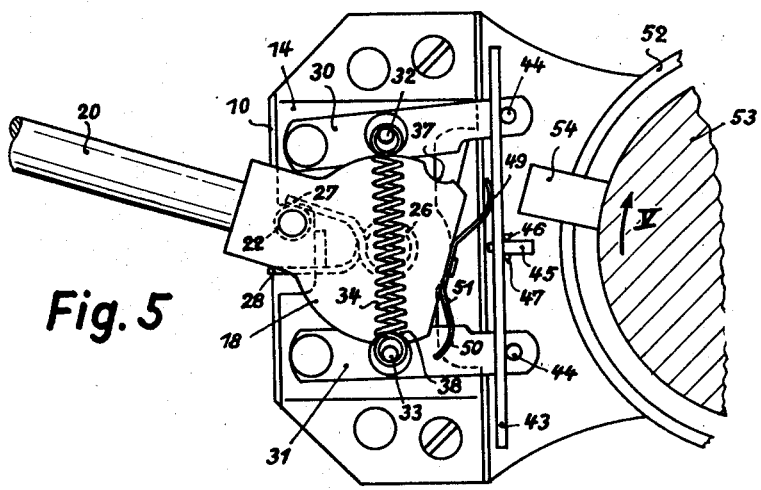
Fig. 5 shows the switch in one of its "on" positions.

In the drawings the terminal plate 10 which is made of insulating material carries three terminals, 11, 12, and 13; the terminals 11 and 12 having contacts 11' and 12' for the two direction indicators (not shown) and the terminal 13 being connected to a current source. A substantially U-shaped metal bracket 14 is also fastened to said terminal plate. A bolt 15 forming the actuating shaft of the switch is passing through holes disposed in the center of the terminal plate and the bracket and is protruding beyond the terminal plate and the bracket. Axial movement of this bolt is prevented by a snap ring 16 and a washer 17 arranged between cam plate 18 and the bracket 14, said cam plate being fastened to the bolt 15. A protruding part 19 of the cam plate is bent towards the terminal plate. The switch arm 20 and the switch handle 21 are fastened to this part 19. A bolt 22 is fastened to the cam plate and engages a recess 23 of a non-conducting disk 24 disposed concentrically to bolt 15. Fastened to the disk 24 is a contact spring 25 coacting with contacts 11' and 12'. A coil spring 26 surrounds the bolt 15, said coil spring having two free ends 27 and 28 extending sideways, one of said free ends pressing against bolt 22 when the switch is in one of its "on" positions, the other one of said free ends bearing against extension 29 of bracket 14. Two pawls 30 and 31 are arranged on both sides of the cam plate and are pivoted on pins on the bracket 14. The free ends of said pawls are protruding beyond the cam plate and the bracket towards the steering shaft. The pawls are disposed in the same plane as the washer 17. Pins 32 and 33 are mounted midways on the pawls and a tension spring 34 is attached to the ends of these pins. Small rollers 35 and 36 are carried by these pins and bear against the sides of the cam plate. These rollers drop into shallow recesses 37 and 38 of the cam plate when the cam plate is turned to one of its "on" positions. These recesses are of such a shape i. e. their sides 29 are inclined in such a way that the rollers can easily be forced out of the recesses when the cam plate is manually turned.

A flat bar 43 is acting as control or actuating member for unlocking the pawls. This bar is provided with slots 40 and 41 (Fig. 4) and is slipped over the free ends of the pawls. The bar is prevented from falling off the pawls by pins 44. The slots have such a length that with the switch in its "off" position the bar 43 can be moved a short distance without bringing the bottoms of the slots in contact with the pawls. A lug 45 is disposed midways on the side of the bar facing the steering column. This lug 45 serves as guide for the free ends 46 and 47 of a hair pin spring 48, which is fastened to the terminal plate and which exerts a constant pressure against the lug side of bar 43. Against the other side of bar 43 bear the free ends 49 and 50 of a leaf spring 51, which is fastened to the cam plate. These two springs 48 and 51 keep the bar in such a position that, with the switch in its "off" position, (Fig. 1), there is a distance "a" between the bar and the pins 44, whereas, with the switch in one of its "on" positions (Fig. 5), the bar abuts the pins 44.

The switch is mounted on the steering column 52 as indicated in Fig. 1 and so arranged that in its "off" positions the lug 45 will not touch the lug 54 on the steering shaft 53, when the steering shaft is turned. However in the "on" position of the switch the lug 45 will be moved further out and come within the path described by the lug 54, as the bar 43 will then have been pushed into abutment with pins 44 by the leaf spring 51, provided that the outward movement of lug 45 will not have been obstructed by lug 54.

Fig. 1 shows the switch in its "off" position, in which lug 45 is outside the path of lug 54, so that the operation of the steering mechanism will have no influence on the operation of the switch. If the driver wants to indicate that he intends to turn to the right or to the left, he will turn the switch handle 21 to the respective position (Fig. 5). The cam plate respective the leaf spring 51 will then bring the bar 43 into abutment with the pins 44 overcoming the tension of the spring 48 and the lug 45 will thereby come within the path of lug 54. As a rule the vehicle will move in a straight ahead position previously to the turning of the switch. In the straight ahead position of the steering mechanism the lug 54 will be positioned immediately in front of lug 45. In this case, when turning the switch to one of its "on" positions, the lug 45 will abut against lug 54, thereby preventing for the time being the shifting of bar 43 towards the pins 44.

In spite of this fact it will be possible to turn the cam plate against the pressure of spring 51, until the roller 38 of the pawl 31 engages the recess in the cam plate (Fig. 7), thereby actuating the respective direction signal. When the driver turns the steering shaft in the direction of the arrow V in order to make the indicated turn, the lug 45 will slide off lug 54 and the spring 51 will shift the bar 43 into abutment with pins 44. If, after completing the turn, the steering shaft is turned back to its straight ahead position the lug 54 will engage the lug 45 and will move the bar 43 and the pawl 31 sideways to such an extent that the cam plate will become disengaged and will be returned to its "off" position by the return spring 26, thus switching off the direction indicator. At the same time the bar 43 will be retracted out of the path of the lug 54 by the free ends 46, 47 of the spring 48.

Should the driver switch on the wrong direction indicator, he will be able to switch over to the other direction indicator regardless of the position of the steering shaft. To disengage the pawl from the cam plates the lug 54 respective the steering shaft will only have to be rotated over a very small angle as the lug 45 is located substantially centrally between the pawls.

Figure 6:
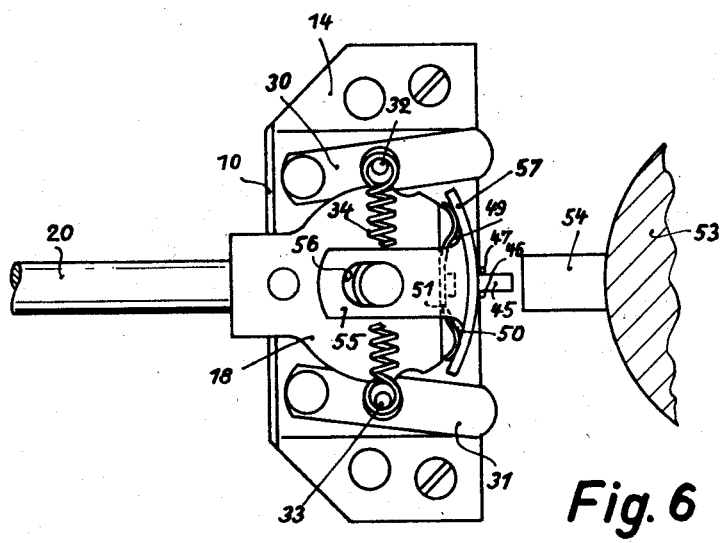
Fig. 6 is a top view of another embodiment of an electrical switch of the type described.

In the switch shown in Fig. 6 the bar shaped actuating member 43, is replaced by a disk 55 disposed adjacent to the cam plate and having a slot 56, so as to be rotatable and slidable on the bolt 15. An arcuate bar 57 is disposed on that part of the disc 55 which protrudes beyond the cam plate. The ends of the bar 57 abut against the pawls, when the disk 55 is turned. The lug 45 is disposed midways on the outside of the bar 57 and is engaged by the free ends 46 and 47 of the hair pin spring. The ends of the leaf spring 51 bear against the inside of bar 57. An advantage of this embodiment is that the switch requires less space than the embodiment shown in Figs. 1 to 5, as the pawls are shorter and the ends of the bar 57 do not have to protrude beyond the pawls.

We claim:

1. In a steering column mounted vehicle turn indicator switch of the automatically unlocked type, in combination: a rotatable cam plate mounted on a switch shaft, means for manual operation of said cam plate, movable contacts operated by said cam plate and cooperating with a plurality of stationary contacts, said cam plate when manually brought into either one of its two "on" positions being locked in said position by one of two spring biased latch means, a return spring for said cam plate, a common actuating member for both the latch means operated by a cam on the steering shaft, said steering shaft cam moving said actuating member in a direction substantially transverse to a plane common to the axes of the steering shaft and the switch shaft and thereby bringing said actuating member into contact with said latch means and disengaging said latch means from said cam plate.

2. Switch as claimed in claim 1 in which the steering shaft can contacts said actuating member at a point located midways between said two latch means.

3. In a steering column mounted vehicle turn indicator switch of the automatically unlocked type, in combination: a rotatable cam plate, movable contacts operated by said cam plate and cooperating with a plurality of stationary contacts fastened to a base plate, said cam plate when manually brought into either one of its two "on" positions being locked in said position by one of two spring biased latch means engaging a suitable recess in said cam plate, said cam plate being returned to its "off" position by a return spring after being unlocked by an actuating member operated by a cam on the steering shaft, said steering shaft cam moving said actuating member in a direction substantially transverse to a plane common to the axes of the steering shaft and the switch shaft and thereby bringing said actuating member into contact with said latch means and disengaging said latch means from said cam plate, said actuating member being yieldingly disposed between two spring means, one of said spring means being fixed to said cam plate and the other one of said spring means to said base plate, whereby said first mentioned spring means moves said actuating member towards said steering shaft in opposition to said last mentioned spring means, when said cam plate is manually turned to one of its "on" positions thereby bringing said actuating member within the path of said steering shaft cam, and whereby said last mentioned spring means retracts said actuating member out of the path of said steering shaft cam, after said cam plate has been returned to its "off" position.

4. Switch as claimed in claim 3 in which a substantially U-shaped bracket is fastened to said base plate, said switch shaft being rotatably supported in said base plate and said bracket, said two latch means being pivotally supported on said bracket and being biased by a tension spring, the ends of said tension spring being fastened to said two latch means.

5. Switch as claimed in claim 4 in which stops are provided on the free ends of said two latch means, said actuating member being shaped like a bar and being slotted at each end, said slotted ends being slidably mounted on the free ends of said two latch means in such a way that, when turning the switch to one of its "on" positions, said actuating member can move towards the steering shaft and into abutment with said stops.

6. Switch as claimed in claim 4 in which said actuating member is pivotally and slidably mounted on said switch shaft.

7. Switch as claimed in claim 6 in which said actuating member comprises a plate like portion slidably and pivotally mounted on said switch shaft and a bar like portion, a lug being provided on said bar like portion, said bar like portion being yieldingly disposed between said two spring means, said lug acting as a guide for the free ends of that spring means which is fastened to said base plate, said lug being within the path of said steering shaft cam when the switch has been turned to one of its "on" positions.

WILLY PAULE.
MAX KNAPP.

REFERENCES CITED

The following references are of record in the file of this patent:

UNITED STATES PATENTS

| Number | Name | Date |
|---|---|---|
| 1,690,370 | Hoeller | Nov. 6, 1928 |
| 1,912,824 | Cloke | June 6, 1933 |